United States Patent
Boehlke

(10) Patent No.: US 11,062,722 B2
(45) Date of Patent: Jul. 13, 2021

(54) STREAM ADAPTATION FOR LATENCY

(71) Applicant: Summit Wireless Technologies, Inc., Beaverton, OR (US)

(72) Inventor: Kenneth A. Boehlke, Portland, OR (US)

(73) Assignee: Summit Wireless Technologies, Inc., Beaverton, OR (US)

( * ) Notice: Subject to any disclaimer, the term of this patent is extended or adjusted under 35 U.S.C. 154(b) by 182 days.

(21) Appl. No.: 15/863,670

(22) Filed: Jan. 5, 2018

(65) Prior Publication Data

US 2019/0214034 A1 Jul. 11, 2019

(51) Int. Cl.
| | |
|---|---|
| *G10L 19/24* | (2013.01) |
| *H04W 84/12* | (2009.01) |
| *G10L 19/005* | (2013.01) |
| *G10L 19/16* | (2013.01) |
| *H04L 12/70* | (2013.01) |

(52) U.S. Cl.
CPC ............ *G10L 19/24* (2013.01); *G10L 19/005* (2013.01); *G10L 19/167* (2013.01); *H04L 47/00* (2013.01); *H04W 84/12* (2013.01)

(58) Field of Classification Search
CPC ..... G10L 19/24; G10L 19/167; G10L 19/005; H04L 47/00; H04L 47/2416; H04W 84/12
See application file for complete search history.

(56) References Cited

U.S. PATENT DOCUMENTS

| | | | | |
|---|---|---|---|---|
| 5,917,835 | A  * | 6/1999 | Barrett | H04L 69/04 |
| | | | | 369/93 |
| 8,755,790 | B1 * | 6/2014 | Shen | H04L 65/80 |
| | | | | 455/423 |
| 2002/0004840 | A1 | 1/2002 | Harumoto et al. | |
| 2004/0044783 | A1 | 3/2004 | Nordberg | |
| 2006/0143678 | A1 | 6/2006 | Chou et al. | |
| 2006/0282566 | A1 * | 12/2006 | Virdi | H04L 29/06027 |
| | | | | 710/52 |
| 2009/0225790 | A1 | 9/2009 | Shay et al. | |
| 2010/0085979 | A1 * | 4/2010 | Liu | H04L 45/00 |
| | | | | 370/408 |
| 2010/0246459 | A1 * | 9/2010 | Ding | H04B 1/1615 |
| | | | | 370/311 |
| 2010/0268836 | A1 * | 10/2010 | Jabri | H04L 47/38 |
| | | | | 709/231 |
| 2010/0290454 | A1 | 11/2010 | Lundberg | |
| 2011/0010625 | A1 | 1/2011 | Pettersson et al. | |
| 2011/0050847 | A1 | 3/2011 | Sasaki et al. | |

(Continued)

OTHER PUBLICATIONS

"Transform | Definition of Transform by Mirriam-Webster", https://www.merriam-webster.com/dictionary/transform, accessed on Jan. 25, 2021 (Year: 2021).*

(Continued)

*Primary Examiner* — Farley Abad
(74) *Attorney, Agent, or Firm* — Chernoff Vilhauer LLP

(57) ABSTRACT

A system and method for adapting an audios stream for reducing latency. The method may include the steps of, and the system may function to, receive an audio stream having a packet buffer and an audio buffer, measure the audio buffer depth of the audio buffer, measure the presentation time margin of at the input to the packet buffer, and determine an adaptation level for latency based on the measured values.

22 Claims, 1 Drawing Sheet

(56) References Cited

U.S. PATENT DOCUMENTS

2014/0143587 A1* 5/2014 Rajapakse .......... H04N 21/4305
                                                          713/600
2015/0281288 A1   10/2015 Levinson et al.

OTHER PUBLICATIONS

International Search Report prepared by the US Receiving Office for PCT/US2019/012087, dated May 29, 2019, 4 pages.
Written Opinion prepared by the US Receiving Office for PCT/US2019/012087, dated May 29, 2019, 4 pages.

* cited by examiner

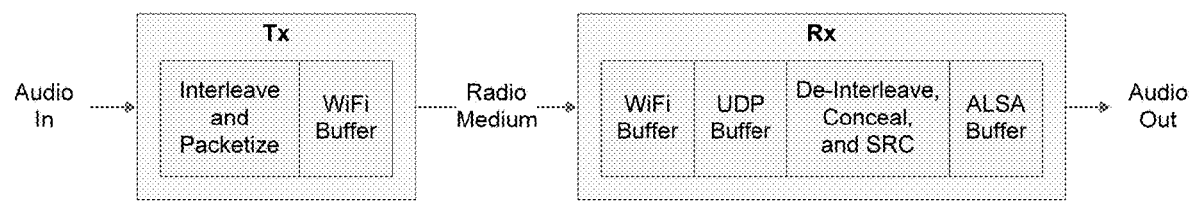

STREAM ADAPTATION FOR LATENCY

BACKGROUND OF THE INVENTION

This invention relates to the field of wireless audio systems. Home systems are frequently more reliant on wireless transmission, which comes with benefits and drawbacks. With wired systems, speaker quality disintegrates only when the speaker or wire wears out over time. Wired systems are also fairly interoperable, such that wires and speakers from one brand can work to be connectable to components from a different brand. Wireless transmission of audio allows, however, for ease in positioning of speakers, without the bulk and burden of accommodating wires behind furniture, under carpet, etc. With wireless speakers, they can be placed wherever a user chooses, and they can be configured to the correct channel.

However, wireless transmission of audio brings with it numerous disadvantages that consumers would not encounter using wired systems. Digital wireless transmission must comply with given power and bandwidth limits. Such bands are also shared with other traffic, which can restrict bandwidth availability. To anticipate and correct for some of the downgraded audio due to the congestion, digital wireless audio systems compromise by reducing the sample rate or performing compression, both of which reduce quality of the resulting audio signal.

Synchronization of speakers or other output devices and minimization of system latency are critical requirements for high quality audio whether or not combined with video. The human ear is sensitive to phase delay or channel-to-channel latency and multi-channel audio output with channel-to-channel latency greater than 50 microsecond (µs) is commonly described as disjointed or blurry sound. On the other hand, source-to-output delay or latency ("lip-sync") greater than 50 milliseconds (ms) is commonly considered to be noticeable in audio-video systems. In a digital network, such as an audio/video system, a source of digital data transmits a stream of data packets to the network's end points where the data is presented. Typically, a pair of clocks at each node of the network controls the time at which a particular datum is presented and the rate at which data is processed, for examples, an analog signal is digitized or digital data is converted to an analog signal for presentation. The actual or real time that an activity, such as presentation of a video datum, is to occur is determined by "wall time," the output of a "wall clock" at the node. A sample or media clock controls the rate at which data is processed, for example, the rate at which blocks of digital audio data introduced to digital to analog converter.

Audio video bridging (AVB) is the common name of a set of technical standards developed by the Institute of Electrical and Electronics Engineers (IEEE) and providing specifications directed to time-synchronized, low latency, streaming services over networks. The Precision Time Protocol (PTP) specified by "IEEE Standard for a Precision Clock Synchronization Protocol for Networked Measurement and Control Systems," IEEE Std. 1588-2008 and adopted in IEEE 802.1AS-2011—"IEEE Standard for Local and Metropolitan Area Networks-Timing and Synchronization for Time-Sensitive Applications in Bridged Local Area Networks" describes a system enabling distributed wall clocks to be synchronized within 1 µs over seven network hops. A master clock to which the remaining distributed clocks, or slave clocks, are to be synchronized is selected either by a "best master clock" algorithm or manually. Periodically, the device comprising the master clock (the "master device") and the device(s) comprising the slave clock(s) (the "slave device(s)") exchange messages which include timestamps indicating the master clock's "wall time" when the respective message was either transmitted or received by the master device. The slave device notes the local wall times when the respective messages were received or transmitted by it and calculates the offset of the slave clock relative to the master clock and the network delay, the time required for the messages to transverse the network from the master device to the slave device. With repeated measurements, the frequency drift of the slave clock relative to the master clock can also be determined enabling the slave clock to be synchronized with the master clock by adjusting the slave clock's wall time for the offset and the network delay and adjusting the slave clock's frequency for any frequency drift relative to the master clock.

PTP can synchronize wall clocks of an extensive network or even plural networks, but the accuracy of PTP can be strongly influenced by the loading and exposure to interference of the wireless communication link(s). An alternative to PTP for synchronizing the wall time at plural devices of a wireless network is the Time Synchronization Function (TSF) specified in IEEE 802.11, "IEEE Standard for Information Technology-Telecommunications and Information Exchange Between Systems Local and Metropolitan Area Networks." Every 802.11 compliant device in a network known as a basic service set (BSS) includes a TSF counter. Periodically, during a beacon interval, devices of the BSS transmit a beacon frame containing a timestamp indicating the local wall time at the transmitting device and other control information. A receiving node or slave device receiving the beacon frame synchronizes its local time by accepting the timing information in the beacon frame and setting its TSF counter to the value of the received timestamp if the timestamp indicates a wall time later than the node's TSF counter.

However, neither PTP nor TSF provide for synchronization of the media or sample clocks which control the rate at which application data is processed by the processing elements of the network's devices. The AudioNideo Bridging Transport Protocol (AVBTP) of "IEEE 1722-2011: Layer 2 Transport Protocol for Time Sensitive Applications in a Bridged Local Area Network" provides that each network end point (a device that receives or transmits data) is to recover the sample clock from data in the packetized data stream transmitted by the data source. Each data packet comprises plural application data samples, for example, audio data samples, and a time stamp indicating the wall time at which presentation of the application data in the packet is to be initiated. At each network end point, for example, an audio speaker unit, a sample clock is generated which oscillates at a frequency that enables the plural application data samples in a data packet to be presented for processing within the time interval represented by successive timestamps.

While PTP, TSF and AVBTP provide means for synchronizing distributed clocks, not all packets transmitted by a network data source, particularly packets transmitted wirelessly, reach their destinations. As packets are lost, each network end point, for example, the plural speaker units of a surround sound audio system, receives a respective aliased subsample of the timestamps and over time the clocks of the respective network endpoints will not track. What is desired, therefore, are accurate consistently synchronized sample clocks at a plurality of related network endpoints.

Digital audio signals may be composed of a succession of 24-bit samples at a rate of 48 kSa/s. A complete multi-channel audio sample comprises one sample for each channel. Thus, in the case of an eight channel home theater audio system, one multi-channel sample comprises eight 24-bit samples.

A radio transmitter may transmit a digital audio data wirelessly to radio receivers incorporated in the speakers. The digital audio signal is supplied to a packetizer, which constructs a transmission packet having a payload that contains the digital audio data for several, e.g. 48, multi-channel audio samples. In the case of the eight channel system, the transmission packet may contain the data for six multi-channel samples.

The radio transmitter employs the transmission packet data bits to modulate a carrier at the frequency of a selected communication channel and transmits the modulated signal via an antenna. In each speaker, a radio receiver receives the modulated signal and detects the modulating transmission packet data bits. An audio processor included in the speaker recovers the digital audio signal assigned to that speaker from the successive transmission packets, converts the digital audio signal to analog form, amplifies the analog audio signal and supplies the audio signal to the audio driver.

In the case of a home theater system having wireless speakers, in order to match the timing of the audio and the video to the viewer or listener, A/V systems include a video buffer to delay the video to match the network processing delay of the audio. This buffer is costly, so it is preferable to design the wireless audio transmission with a low fixed latency requirement.

WiFi operates in the unlicensed ISM (2.45 GHz) and UNII (6 GHz) bands, so there is not guarantee of access to a WiFi channel. Multiple networks, each with its own WiFi Access Point, receiving data from the A/V source, and multiple "clients", such as speakers that receive audio information from the Access Point, can all operate on the same WiFi channel. As mentioned previously, as activity on the channel increases, it takes longer to get access to a WiFi channel, so delay between the audio and the video increases. A/V systems have attempted to increase the probability that the audio will be delivered in time when there is heavy congestion in such a WiFi channel by heavily compressing the audio from the Access Point. Audio compression allows for a gradual degradation in audio quality instead of muting the audio at times of peak congestion.

SUMMARY OF THE INVENTION

In one embodiment, the present invention includes a method for adapting an audio stream to reduce latency including the steps of receiving an audio stream at an audio output, the audio output having a packet buffer and an audio buffer, measuring an audio buffer depth of the audio buffer, measuring a presentation time margin at an input to the packet buffer, comparing the audio buffer depth a depth limit, and the presentation time margin to a time limit, and determining an adaptation level based on the comparison. The use of an adaptation allows for low streams, having more critical information, to be transmitted at lower data rates, and higher streams, having less critical information, to be transmitted at higher data rates.

In another embodiment, the present invention includes a system for adapting an audio stream to reduce latency, including an audio input component capable of receiving an audio stream from a source and transmitting the audio, where the audio stream has a bit rate, an audio output component capable of receiving the audio stream transmitted by the audio input component, and a computing component capable of determining whether a reduced network capacity exists. If the reduced network capacity exists, then employing an adaptation component to alter the bit rate of the audio stream to a constant latency

BRIEF DESCRIPTION OF THE SEVERAL VIEWS OF THE DRAWINGS

For a better understanding of the invention, and to show how the same may be carried into effect, reference will now be made, by way of example, to the accompanying drawings, in which:

FIG. 1 is a graphical representation of one embodiment of a portion of the invention, including components of the audio input and audio output.

DETAILED DESCRIPTION OF THE INVENTION

In one embodiment of the present invention, the problem of congestion may be solved by dividing the source audio, or audio stream, into multiple streams. The streams are sliced into tranches, categorized such that the lower streams contain the most critical audio information and the upper streams contain the less critical audio information. An example of a dividing method is by audio Sampling Rate and SNR (Bit depth) and the packets are Block Interleaved for robustness, refer to U.S. Pat. No. 9,454,968. In so dividing, the more important portions of the audio stream information that would be best received by a listener may be prioritized over less important audio information.

Once divided, the lowest stream, sometimes referred to as "Tranche 0", is sent at the lowest PHY rate (the base rate) for the most robust link. The higher streams are sent at progressively higher data rates, which are of decreasing robustness, to facilitate allowance of the most critical information delivered via the lowest stream.

In one embodiment of the present invention, Tranche 0 is sent in a Group or Multicast format and has relatively low quality audio at lower data rates for critical speakers, and control/timing information for all speakers. For example, the quality of the Tranche 0 audio may be 8 bit Block FP at 12 kHz. The other streams may have audio sent at higher data rates and greater bit depth, as well as control/timing information for all speakers. For example, the other streams may have data rates of 48/96/192 kHz for Tranches 1, 2, 3, respectively. They may have bit depths of 16/24/32 bits for Tranches 1, 2, 3, respectively. The other streams may also be sent in Group/Multicast format.

In another embodiment, the system sends packets in a Unicast format or a mix of Unicast and Group/Multicast formats.

During times of network interference, reduced network capacity, or RF fading, the upper, or high, streams may be temporarily lost, and audio will be reconstructed with Tranche 0 only. Such a loss will result in a decrease or drop in audio quality, but this degradation will not be audible to a listener because of its short duration.

During times of high network loading, or reduced network capacity, the system, or a computing component of the system, may adapt to preserve constant, low latency. Once such adaptation employed is reduction of the bit rate of the audio stream. In one embodiment of the invention, levels of adaptation may be defined in the following manners:

Level 0: Normal, no adaptation required.

Level 1: Compress or reduce the number of bits of the high, or upper, stream. Such compression or reduction may be accomplished using an audio compression algorithm.

In another embodiment of the invention, levels of adaptation may be defined in the following manners:

Level 0: Normal, no adaptation required.

Level 1: Lower the bit depth of Tranche 1 audio to 16 bits. Discard Tranche 2 and Tranche 3.

Level 2: Adaptation of Level 1, plus increasing the PHY rate of Tranche 0 and Tranche 1.

Level 3: Adaptation of Level 2, plus packet decimating Tranche 1. In this decimation three of the four Tranche 1 packets are discarded at the Tx, T1_0, T1_1, and T1_3. Only two of the five packets for 4-way interleaving are transmitted. Similarly, only three out of the nine packets for 8-way interleaving are transmitted.

Level 4: Adaptation of Level 3, plus mixing down the audio channels from a more divided audio configuration (such as 7.1, 6.1 or 5.1) to a less divided audio configuration (such as 3.1 or 2.0).

As displayed in graphical flowchart format in FIG. 1, the latency of the audio system is measured from the transmitter "Tx" audio input to the receiver "Rx" audio output. To further factor in adaptation of the system, the ASLA Audio Buffer Depth (ABD) and the Presentation Time Margin (PTM) are measured and tracked. The ABD indicates the status of the audio data availability. Under normal circumstances, the ALSA Buffer is nearly full and data is pulled from the UDP buffer for maintenance. This process keeps the ABD between full and full minus the size of an interleaving block. Other types of audio buffers may be used in place of the ALSA buffer.

The PTM is measured at the input to a packet buffer, such as a UDP Packet buffer, and includes the delay of the Tx and Rx WiFi stacks and the time to access the Radio Medium. The PTM is the excess amount of time from when packets are received at the Rx until they must be played. The PTM is calculated with a running average over the difference between the Presentation Time (PTime) in the received packet and the TSF time that arrives into the UDP Packet buffer, as represented by the following equation:

$$PTM(k) = \frac{1}{N}\sum_{n=0}^{N-1}[PTime(k-n) - TSF(k-n)]$$

Where k and n are indexes at interleaving block times.

This average is for either T0 or T1_0 packets (one per interleaving block). The average is over N interleaving block times regardless of dropped packets. Dropped packets are removed from average and the N divisor is adjusted down. The PTM is an indirect measurement of the loading of the network and this value generally decreases as the loading increases. If the audio data packet arrives after its Presentation Time, the PTM will be negative, signifying that the data arrived too late to be played.

In one embodiment of the invention, a computing component measures both the PTM and the ABD and determines whether a reduced network capacity exists. When both the PTM and the ABD are low, drastic action may be taken to avoid emptying of the buffer. When either the PTM or the ABD are low, moderate action may be taken. Table 1 shows the adaptation level, as described above, that should be undertaken, by an adaptation component, given the PTM and ABD levels where:

Plimit=200%*Interleaving Block Size

Dlimit=ALSA Buffer Size−(200%*Interleaving Block Size)

| | Adaptation Level | |
|---|---|---|
| | ABD > Dlimit | ABD < D limit |
| PTM > Plimit | 0 | 2 |
| PTM < Plimit | 1 | 3 |

Adaptation Level 4 will be entered following a Level 3 persistence of more than one second. In one embodiment of the invention, adaptation Levels 1 and 2 are interchangeable.

Once such adaptation is enacted, the corresponding data is transmitted to the audio output. After the high network loading event subsides, the adaptation level will decrease back to 0 and the full audio accuracy will return to the audio output. Although the audio accuracy may have diminished, at no time during the network congestion event was the audio interrupted or delayed.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method for adapting an audio stream to reduce latency, said method comprising the steps of:
   (a) receiving an audio stream at an audio output, said audio output having a packet buffer and an audio buffer;
   (b) measuring an audio buffer depth of said audio buffer;
   (c) measuring a presentation time margin at an input to the packet buffer;
   (d) comparing said audio buffer depth to a depth limit, and said presentation time margin to a time limit; and
   (e) determining an adaptation level based on said comparing.

2. The method of claim 1, further comprising the step of determining at least one adaptation level selected from the group comprising Level 0, Level 1, Level 2, Level 3, and Level 4.

3. The method of claim 2 wherein if the measured audio buffer depth is greater than said depth limit and said measured presentation time limit is greater than said time limit, then adaptation Level 0 is undertaken.

4. The method of claim 2 wherein if the measured audio buffer depth is greater than said depth limit and said measured presentation time limit is less than said time limit, then adaptation Level 1 is undertaken.

5. The method of claim 2 wherein if the measured audio buffer depth is less than said depth limit and said measured presentation time limit is greater than said time limit, then adaptation Level 2 is undertaken.

6. The method of claim 2 wherein if the measured audio buffer depth is less than said depth limit and said measured presentation time limit is less than said time limit, then adaptation Level 3 is undertaken.

7. The method of claim 6 wherein adaptation Level 4 is undertaken once adaptation Level 3 is undertaken for more than one second.

8. The method of claim 1 wherein said determining of said adaptation level includes the step of dividing said audio stream into at least a low stream and a high stream, wherein said low stream is transmitted at a lowest data rate and said high stream is transmitted at a data rate higher than said lowest data rate.

9. The method of claim 8 wherein said determining an adaptation is based on determining the following adaptation levels:
Level 0: Normal, no adaptation required;
Level 1: Lower a bit depth of said low stream audio to 16 bits; and
Level 2: Adaptation of Level 1, plus increasing a PHY rate of said low stream and said high stream.

10. The method of claim 8 wherein said determining an adaptation is based on determining the following adaptation levels:
Level 0: Normal, no adaptation required; and
Level 1: Using an audio compression algorithm, reduce a number of bits of said high stream.

11. The method of claim 9, wherein said diving of said audio streams include four levels of audio stream, Tranche 0, Tranche 1, Tranche 2, and Tranche 3, such that Tranche 0 is the lowest stream and Tranche 3 is the highest stream, and said determining of said adaptation is based on the following adaptation levels:
Level 0: Normal
Level 1: Lowering said bit depth of Tranche 1 audio to 16 bits and discard Tranche 2 and Tranche 3;
Level 2: Level 1 plus increasing the PHY Rate of Tranche 0 and Tranche 1;
Level 3: Level 2 plus decimating Tranche 1; and
Level 4: Level 3 plus mixing down; 7.1 to 5.1 to 3.1 to 2.0.

12. The method of claim 9 wherein said time limit and said depth limit are calculated using the following relationships:

time limit=200%*Interleaving Block Size depth limit=audio buffer size−(200%*Interleaving Block Size).

13. The method of claim 1 wherein the said step of measuring said presentation time margin is measured using the following equation:

$$PTM(k) = \frac{1}{N} \sum_{n=0}^{N-1} [PTime(k-n) - TSF(k-n)]$$

where k and n are indexes at interleaving block times.

14. The method of claim 1 wherein the audio buffer is an ALSA buffer.

15. The method of claim 1 wherein the packet buffer is a UDP buffer.

16. A system for adapting an audio stream to reduce latency, said system comprising:
(a) an audio input component capable of receiving an audio stream from a source and transmitting the audio stream, said audio stream having a bit rate;
(b) an audio output component capable of receiving the audio stream transmitted by the audio input component, and including a packet buffer and an audio buffer;
(c) a computing component using a network capacity metric based on the statistics of the difference between the time the audio stream is to be played and when the audio data stream is received at the audio output component, and
(d) if a reduced network capacity exists, employing an adaptation component to alter the bit rate of the audio stream to a constant latency by dividing the audio stream into at least a low stream and a high stream, wherein said low stream is transmitted at a lowest data rate and said high stream is transmitted at a data rate higher than said lowest data rate, and wherein an adaptation employed by the adaptation component is determined by comparing an audio buffer depth to a depth limit and a presentation time margin to a time limit.

17. The system of claim 16, wherein said packet buffer comprises a UDP buffer.

18. The system of claim 16, wherein said audio buffer comprises an ALSA buffer.

19. The system of claim 16 wherein said audio input component includes a WiFi Buffer component.

20. The system of claim 16 wherein said audio input component includes an interleaving and packetizing element.

21. The system of claim 16, wherein said audio output component includes a Wifi Buffer component.

22. The system of claim 16 wherein said audio output component includes a de-interleaving, concealing, and SRC element.

* * * * *